UNITED STATES PATENT OFFICE.

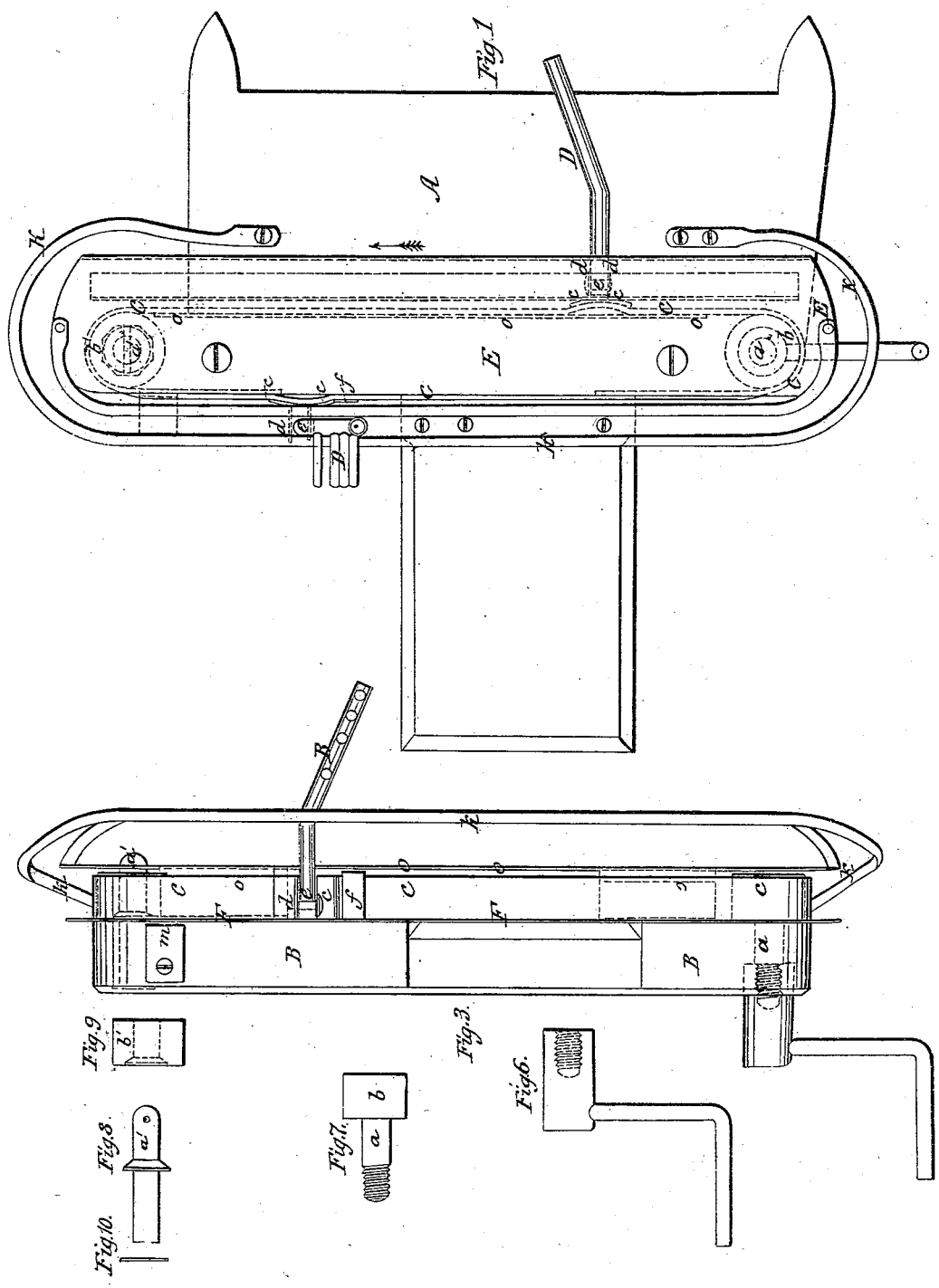

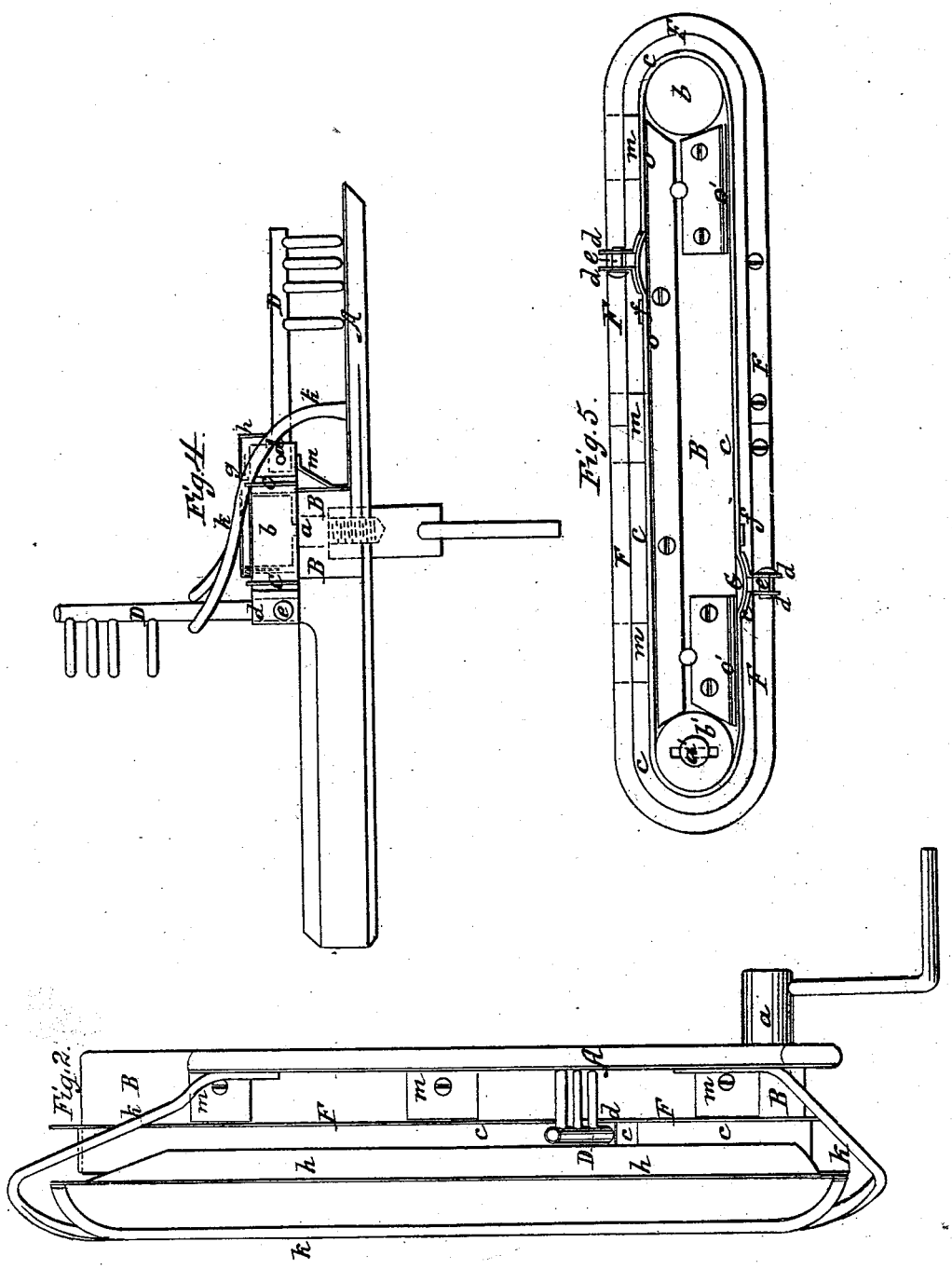

J. P. GREEN AND I. DODENHOFF, OF BLOOMINGTON, ILLINOIS.

IMPROVEMENT IN AUTOMATIC RAKES FOR HARVESTING-MACHINES.

Specification forming part of Letters Patent No. 17,088, dated April 21, 1857.

*To all whom it may concern:*

Be it known that we, JONATHAN P. GREEN and ISRAEL DODENHOFF, of Bloomington, in the county of McLean and State of Illinois, have invented a certain new and useful Improvement in Automatic Rakers for Harvesting-Machines; and we do hereby declare the following to be a full, clear, and exact description thereof, reference being had to the accompanying drawings of the same, making a part of this specification, in which—

Figure 1 represents a top view; Fig. 2, a front view; Fig. 3, a back view; Fig. 4, an elevation of the right-hand side of the machine; Fig. 5, a top view with top board and rakes removed; Fig. 6, a side view of the crank; Fig. 7, a similar view of vertical pulley at right-hand side; Fig. 8, a side view of stud for vertical pulley at left-hand side; Fig. 9, a side view of vertical pulley at left-hand side; Fig. 10, an edge view of washer for stud.

The nature of our improvement consists in a new and peculiar mode of attaching rakes to endless bands or chains in self-raking reaping-machines and of guiding the same, whereby lateral deflection of the rake and straining of the band or chain are prevented, and the rakes held firmly down to the platform during the operation of raking, while they are left free to rise to a vertical position after they have traversed the length of the platform and deposited the grain on the ground, and again to descend to a horizontal position to renew the operation of raking, the raising and subsequent deflection of the rake being effected by means of inclined planes suitably arranged at either end of the platform.

To enable others skilled in the art to make, construct, and use our invention, we will now proceed to describe it in detail.

The platform A, for the reception of the grain as it is cut, is similar to those in general use. Through the end of the beam B and the side of the platform is pierced a hole for the reception of a shaft, *a*, upon which is mounted a pulley, *b*. This pulley may be driven in any suitable manner from the driving-wheel of the reaper. Upon the other end of the beam B and the platform is secured a stud, *a'*, upon which is mounted another pulley, *b'*, round which and the former, *b*, is passed an endless band or chain, C. To this band or chain are attached rakes D, so bent as that on their descent they shall fall on the outside of the ends of the arms of the reel to prevent collision, and also to sweep the whole of the grain off the platform. These rakes are attached by strong iron jaws *c* to the belt by means of a hinge-joint, so that they shall be capable of rising and falling in a vertical plane. The lips *d* of the jaws *c*, to which they are attached, project considerably forward of the hinged connection *e*, which prevents lateral or rearward deflection of the rakes as they are operated in removing the grain; but as the band C without some support would be apt to give in removing heavy bundles of grain, or by constant use from the strain of the rake upon it, guide-pins *f* are fastened to the band immediately in front of the jaws, which project beyond the upper and lower edges of the band, the ends of which slide in grooves formed on the upper side by the support *o* of the top board, E, and a rib, *g*, running longitudinally of the latter, and on the under side by a bottom board, F, and the support *o* of the top board, E, for their reception, which prevent any deflection of the band. The front part of the top board, E, is bent down so as to form an upper guide, *h*, for the rake—that is to say, to prevent the rake from overriding the grain.

From the rear of the platform A rises, on either side, a spiral bar, *k*, which, as the rakes leave the platform, raises them by its inclined surface to a vertical position, in which position they pass from the pulley *b'* to the pulley *b*, whence they are again deflected downward upon a similarly-inclined plane formed by the other end of said bar *k* at the other end of the platform.

The operation of the rakes, which may be of any required number set at regular intervals apart, is as follows: Motion having been communicated to the pulley *b'* by means of bevel-cogged gearing on the end of its shaft, or other suitable mechanism, the belt C is caused to travel in the direction indicated by the arrow, Fig. 1, around the other pulley, *b*. The motion of the belt causes the rakes D to traverse the platform A and drop the grain at the side next the horses, the rakes at this moment, by the progressive motion of the belt, (they being hinged to it for that purpose,) being caused to assume a vertical position by the inclined spiraled guide-bar *k*, in which position they are held until they arrive at the opposite end, when they are again deflected downward to a horizontal position over the other end of the spiraled bar $k$ by the projecting end of the top board, E, suitably arranged for this purpose.

To prevent the rake during the operation of raking from rising, so as to override the grain, a guide, $h$, is formed on the front side of the top board, which keeps it down to its work until it has traversed the full length of the platform, after which it is free to rise, as before described. In raking the grain off the platform the weight of the grain pressing upon the rake has a tendency to deflect it backward, but which is prevented by the projecting lips $d$ of the jaws $c$. This, however, throws the whole strain upon the belt, which is prejudicial, to avoid which the guide-pins $f$ are secured to it, and made to traverse in grooves above and below the belt, by which all undue strain is removed from the belt at any vertical deflection of the belt either above or below, being prevented by the top and bottom boards, E and F, the latter being supported by spring-brackets $m$, projecting from the timber B on the rear of the platform.

In the description of our improvement such parts only of a reaping-machine have been described as are necessary to their full understanding, all other parts being omitted as unessential.

Having thus described our invention, what we claim as new, and desire to secure by Letters Patent, is—

The mode herein described of attaching rakes to endless belts or chains, and of properly guiding the same, whereby lateral and vertical deflection of the band is prevented in operating the rakes—that is to say, hinging the rakes to the belt C by means of jaws $c$ and projecting lips $d$, when combined with guide-pins $f$, working in grooves to prevent lateral deflection, while a guide-bar, $h$, keeps the rake down to the platform in raking off the grain, all as set forth.

In testimony whereof we hereunto set our hands in presence of two subscribing witnesses.

J. P. GREEN.
ISRAEL DODENHOFF.

Witnesses:
JESSE BIRCH,
A. T. BRISCOE.